United States Patent
Bradley et al.

(10) Patent No.: US 10,142,445 B2
(45) Date of Patent: Nov. 27, 2018

(54) CREATION, PUBLICATION AND DISPLAY OF CONTENT ON A SOCIAL MEDIA NETWORK

(71) Applicant: INTERNATIONAL BUSINESS MACHINES CORPORATION, Armonk, NY (US)

(72) Inventors: Lisa M. W. Bradley, Cary, NC (US); Brian O'Donovan, Dublin (IE); Aaron J. Quirk, Cary, NC (US); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 14/939,705

(22) Filed: Nov. 12, 2015

(65) Prior Publication Data

US 2017/0142035 A1 May 18, 2017

(51) Int. Cl.
*H04L 12/58* (2006.01)
*H04L 29/06* (2006.01)
*H04L 29/08* (2006.01)

(52) U.S. Cl.
CPC .............. *H04L 67/42* (2013.01); *H04L 51/32* (2013.01); *H04L 67/10* (2013.01)

(58) Field of Classification Search
CPC ....... H04L 51/32; H04L 12/588; H04L 67/42; H04L 67/10; H04M 2203/655; G06Q 50/01
See application file for complete search history.

(56) References Cited

U.S. PATENT DOCUMENTS

| | | | |
|---|---|---|---|
| 7,958,192 B2 | 6/2011 | Harik et al. | |
| 8,762,302 B1 | 6/2014 | Spivack et al. | |
| 9,183,259 B1* | 11/2015 | Marra | G06F 17/30867 |
| 2012/0151383 A1* | 6/2012 | Kazan | G06Q 10/101 715/753 |
| 2012/0166284 A1* | 6/2012 | Tseng | G06Q 30/0261 705/14.58 |
| 2013/0018949 A1 | 1/2013 | Pradeep | |
| 2013/0290091 A1* | 10/2013 | Benyamin | G06Q 30/0269 705/14.41 |
| 2014/0280608 A1* | 9/2014 | Hamilton, II | H04L 51/32 709/206 |
| 2016/0246789 A1* | 8/2016 | Wu | G06F 17/30867 |

* cited by examiner

*Primary Examiner* — Wing F Chan
*Assistant Examiner* — Billy H Ng
(74) *Attorney, Agent, or Firm* — Schmeiser, Olsen & Watts, LLP; Daniel Simek (57) ABSTRACT

A publication tool, and methods of use thereof, for publishing user created content as well as republishing content created by others to a social media network. The publication tool incorporates and uses analytic data from a plurality of data sources to identify and evaluate relationships between the user of the social media network and members of social media networks who subscribe to view the content published by the user on the social media network. The publication tool predicts the likelihood that a subscriber of the social media network will publish or share the same content as the user and if the publication tool predicts that the same content will be published by the user and the subscriber, the publication tool will publish the content on the social media network as a joint publication which can be viewed by all common subscribers shared between the user and the subscriber.

19 Claims, 7 Drawing Sheets

CREATION, PUBLICATION AND DISPLAY OF CONTENT ON A SOCIAL MEDIA NETWORK

TECHNICAL FIELD

This disclosure relates generally to social media networks and content generation on social media networks.

BACKGROUND

The Internet, World Wide Web and other computer networks use social media as a platform for generating, distributing, publishing and sharing content to users registered or participating within the network. The user-driven content being created and distributed through the social media network is an expression of unique interests of each individual user in one or more topics. The concept of social media and the idea surrounding the notion of having a strong presence on social media networks has gained significant popularity in recent years. A plethora of avenues for creating, sharing and distributing content on a social media network have been introduced allowing for expansive types of communications, collaboration, messaging, photo and video sharing and location services.

Sharing content amongst users on a social media network, through content streams, such as a "feed" for example, can be cumbersome and repetitive. Often, multiple users having common friends or connections on the social media network share or publish the same content which can result in duplicative alerts within a single content stream.

SUMMARY

A first embodiment of the present disclosure provides a method for publishing content on a social media network, said method implemented by a processor of a computing system, the method comprising the steps of: receiving, by the processor, a request to publish content selected by a user; identifying, by the processor, an associated user to jointly publish the content selected by the user; comparing, by the processor, the content with a repository of stored information about the associated user; calculating, by the processor, as a function of the comparing step, a probability that the content selected by the user will be published independently by the associated user on the social media network; computing, by the processor, a number of joint content viewers shared by the user and the associated user; and publishing, by the processor, the content as a joint publication on the social media network, accessible for viewing by the joint-content viewers, wherein the publishing is performed based on the probability having a value greater than or equal to a pre-specified threshold value.

A second embodiment of the present disclosure provides a computer system comprising a processor, a memory couple to the processor, a computer readable storage device coupled to the processor, said storage device containing program code configured to be executed by the processor via the memory to perform a method for publishing content on a social media network, said method implemented by a processor of a computing system, the method comprising the steps of: receiving, by the processor, a request to publish content selected by a user; identifying, by the processor, an associated user to jointly publish the content selected by the user; comparing, by the processor, the content with a repository of stored information about the associated user; calculating, by the processor, as a function of the comparing step, a probability that the content selected by the user will be published independently by the associated user on the social media network; computing, by the processor, a number of joint content viewers shared by the user and the associated user; and publishing, by the processor, the content as a joint publication on the social media network, accessible for viewing by the joint-content viewers, wherein the publishing is performed based on the probability having a value greater than or equal to a pre-specified threshold value.

A third embodiment of the present disclosure provides a computer program product, comprising a computer readable storage device having a computer readable program code stored therein, said program code configured to be executed by a processor of a computing system to perform a method for publishing content on a social media network, said method implemented by a processor of a computing system, the method comprising the steps of: receiving, by the processor, a request to publish content selected by a user; identifying, by the processor, an associated user to jointly publish the content selected by the user; comparing, by the processor, the content with a repository of stored information about the associated user; calculating, by the processor, as a function of the comparing step, a probability that the content selected by the user will be published independently by the associated user on the social media network; computing, by the processor, a number of joint content viewers shared by the user and the associated user; and publishing, by the processor, the content as a joint publication on the social media network, accessible for viewing by the joint-content viewers, wherein the publishing is performed based on the probability having a value greater than or equal to a pre-specified threshold value.

DETAILED DESCRIPTION

Existing methodologies for publishing content onto web pages and user based networks such as social media networks, including YouTube®, Facebook®, Tumblr®, Instagram®, Myspace®, LinkedIn®, Twitter®, Google+® and others, lack the ability to allow for joint publications and collaborative posting of content by multiple users of the social media network. Often, multiple users may create content, republish content of others or share content with a plurality of users who may subscribe ("subscribers") to receive the content from the user(s) publishing the content (hereinafter "publishing user"). However, due to the limitations of these social media networks, joint publishing and automated joint publishing features are non-existent. Instead of performing a single publication accrediting multiple users with the publication of the content, each publishing user must independently publish, republish or share the content to the social media network individually in order to provide the content to their specific subscribers who may view the content being published. In some instances, each of the publishing users individually publishing, republishing and sharing the content to their subscribers may be considered inefficient, and duplicative. Often on social media networks, multiple publishing users may have one or more subscribers in common with other users or fellow collaborators. When multiple publishing users publish content individually, this may subject users-in-common to receiving multiple alerts or notifications of content being published by one or more users, when in fact, the publications include the same content being published separately by each individual user.

Users may compensate for the lacking joint publication features of social media networks by manipulating the features of social media network in an unintended manner to draw the attention of specific users to their published content. However, the manipulation of social media network features may inadvertently provide a false impression of one or more users being incorrectly included or accredited within the content published, which may have negative impacts on a user's reputation in both real life and in the social media network. Accordingly, embodiments of the present invention describe tools, methods and systems for controlling and streamlining the publication and distribution of content associated with one or more users on a social media network.

Embodiments of the present disclosure describe publication tools and methods for jointly publishing content to social media networks (including social media web pages and applications), which incorporate the use of analytics into the decision making functions of a computer processor. The analytics assist the processor to identify whether or not the content being published by a publishing user, would also be content published by an associated user of the social media network for viewership by the associated user's viewers. If the publication tools determine that the associated user would publish the same content as the publishing user, the publication tools may create a joint publication accrediting the publication of the content to both users simultaneously or near simultaneously. The joint publication accrediting both users may be distributed and published to commonly shared content viewers of both the publishing user and the associated user (joint-content viewers). Conversely, for each non joint content viewer subscribing specifically to the publishing user or the associated user, the publication tools may separately publish the content individually, so that the separate viewers of either the publishing user or the associated user only perceive the publication as being published by the user that the non joint viewers view content of.

Figure 1:
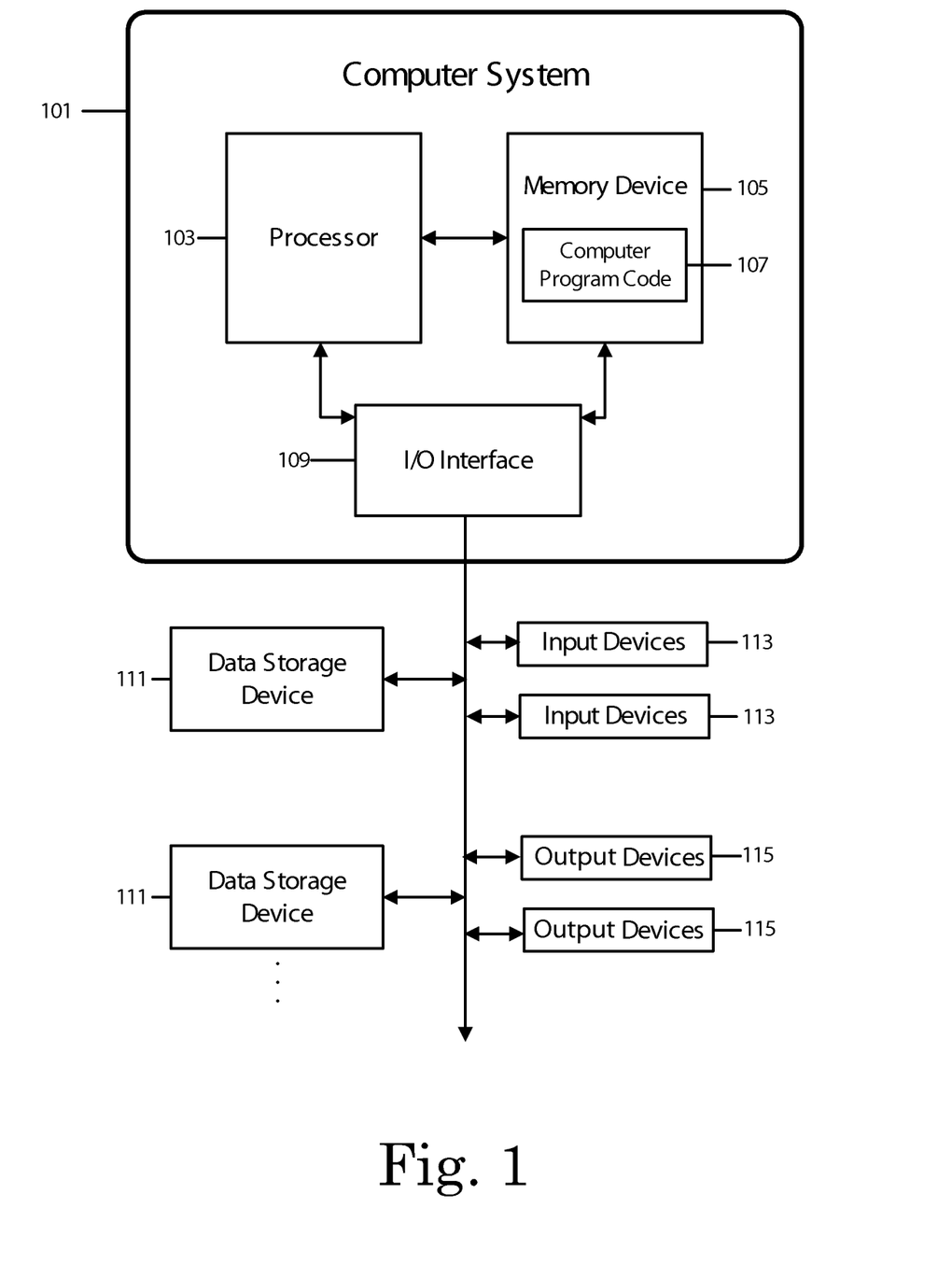
FIG. 1 depicts a block diagram of an embodiment of a computer system and computer program code that may be used to publish content on a social media network.

Referring to the drawings, FIG. 1 illustrates an embodiment of a computer system 101 capable of performing a method for publishing content on a social media network. The embodiment of the computing system may comprise a processor 103 coupled through one or more I/O Interfaces 109 to one or more data storage devices 111, one or more input or output (I/O) devices 113 and 115.

Hardware data storage devices 111 may include, but are not limited to, magnetic tape drives, fixed or removable hard disks, solid state drives (SSD), flash drives, optical discs, storage-equipped mobile devices, and solid-state random-access or read-only storage devices. I/O devices 113, 115 may comprise, but are not limited to: input devices 113, such as keyboards, scanners, handheld telecommunications devices, touch-sensitive displays, tablets, cameras, biometric readers, thumb print scanners, retinal scanners, joysticks, trackballs, or computer mice; and output devices 115, may comprise, but are not limited to printers, plotters, tablets, mobile telephones, displays, or sound-producing devices. Data storage devices 111, input devices 113, and output devices 115 may be connected to the computer system 101 either locally or at remote location from which they may be connected to I/O Interface 109 through a network interface or specialized hardware.

In some embodiments, the computing system 101 may be integrated into or communicate with a network 209 of computing systems 101, each with one or more hardware and software components to perform the method of publishing content on a social media network. In order to communicate amongst the plurality of the computing systems, additional specialized or network based I/O devices may be implemented into the hardware and software of the computing system 101 to facilitate communication between systems. Examples of hardware components may include gateways, routers, switches, bridges, hubs and repeaters, including hybrid network devices such as multilayer switches, protocol converters, bridge routers, proxy servers, firewalls, network address translators, multiplexers, network interface controllers, wireless network interface controllers, modems, ISDN terminal adapters, line drivers, wireless access points and networking cables such as Ethernet cables. Software components on the other hand may include network interface cards (NIC), PC cards, servers, operating systems (OS) such as a network operating system (NOS) and PIMs.

Processor 103 may be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital (SD) memory cards, SIM cards, or other types of memory devices.

At least one memory device 105 may contain computer program code 107, which may be a computer program that comprises computer-executable instructions. The stored computer program code 107 may include a program that performs a method for publishing content on a social media network in accordance with embodiments of the present disclosure, and may implement other embodiments described in this specification, including the methods illustrated in the FIGS. 1-7. In some alternative embodiments, the data storage devices 111 may also store the computer program code 107. Processor 103 may execute the stored computer program code 107. In some embodiments of the computing system 101, the computer program code 107 stored in the storage devices 111 may be configured to be launched by processor 103 via the memory devices 105.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc. Thus the present disclosure discloses a process for supporting computer infrastructure, integrating, hosting, maintaining, and executing computer-readable code 107 into the computer system 101, wherein the code in combination with the computer system 101 is capable of performing a method for publishing content on a social media network.

Any of the components of the present disclosure may be created, integrated, hosted, maintained, executed, managed, serviced, supported, etc. by a service provider or a computing solution that offers a method to facilitate the implementation of a publication tool which may have an analytics engine incorporated therein, allowing for a process of executing or integrating computing infrastructure and/or integrating computer-readable code into the computer system 101, wherein the code in combination with the computer system 101 is capable of performing a method for publishing content on a social media network.

One or more data storage devices 111 (or one or more additional memory devices not shown in FIG. 1 may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

Figure 2:
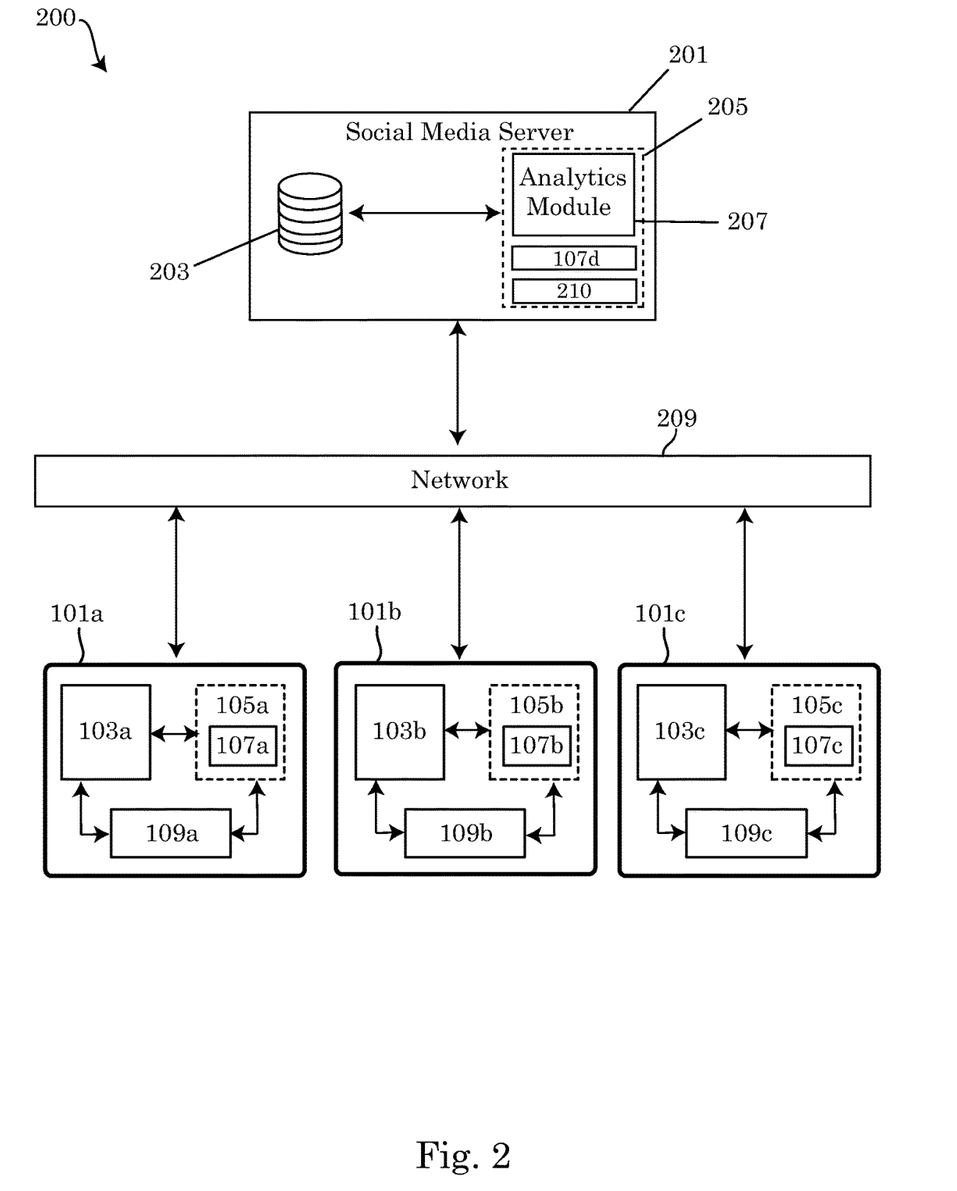
FIG. 2 depicts an embodiment of a schematic of a computing network configured to perform a method for publishing content to a social media network.

While it is understood that program code 107, the program code 107 for publishing content on a social media network, including program code 107 for a publishing tool may be manually executed by loading the program code 107 directly into a computer system 101 such as a computer client, server, proxy computers or other computing systems through a computer-readable storage medium (e.g., computer data storage device 111). Program code 107 may also be automatically, semi-automatically or manually executed by a computer system 101 by sending program code 107 to a central server 201 (e.g., computer system 101) or to a group of central servers 201a, 201b, 201c. Program code 107 may also be downloaded into client computers that connect to the central server and execute program code 107.

Alternatively, program code 107 may be sent directly to the client computer via direct or indirect file transfer. One such method for an indirect file transfer may include e-mail for example. Program code 107 may then either be detached to a directory on the client computer or loaded into a directory on the client computer by an e-mail option that selects a program that detaches program code 107 into the directory.

Another alternative may be to send program code 107 directly to a directory on the client computer hard drive, for example using a file transfer protocol (FTP), Hypertext Transfer Protocol (HTTP), peer to peer file transfer protocol or other network sharing protocols to transfer the program code from one client to another or from a central server to a client. If proxy servers are configured, the process may select the proxy server code, determine on which computers to place the proxy servers' code, transmit the proxy server code, and then install the proxy server code on the proxy computer. Program code 107 may be then transmitted to the proxy server and stored on the proxy server.

In one embodiment, program code 107 implementing a method for publishing content on to a social media network may be integrated into a client 101a, 101b, 101c, server 201a, 201b, 201c and network environment 209 by providing for program code 107 to coexist with software applications (not shown), operating systems (not shown) and network operating systems software (not shown) and then installing program code 107 on the clients and servers in the environment where program code 107 will function. The first step of the aforementioned integration of code included in program code 107 may be to identify any software on the clients and servers, including the network operating system, where program code 107 will be executed that may be required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number may be upgraded to the correct version.

A program instruction that passes parameters from program code 107 to a software application may be checked to ensure that the instruction's parameter list matches a parameter list required by the program code 107. Conversely, a parameter passed by the software application to program code 107 may be checked to ensure that the parameter matches a parameter required by program code 107. The client and server operating systems, including the network operating systems, may be identified and compared to a list of operating systems, version numbers, and network software programs that have been tested to work with program code 107. An operating system, version number, or network software program that does not match an entry of the list of tested operating systems and version numbers may be upgraded to the listed level on the client computers and upgraded to the listed level on the server computers. After ensuring that the software, where program code 107 is to be executed, is at a correct version level that has been tested to work with program code 107, the integration may be completed by installing program code 107 on the clients and/or servers.

Embodiments of the present disclosure may be implemented as a method performed by a processor of a computer system, as a computer program product, as a computer system, or as a processor-performed process or service for supporting computer infrastructure.

Referring to the drawings, FIG. 2 provides an overview of an embodiment 200 of a system that may implement a method for publishing content to a social media network. As shown in the embodiment of FIG. 2, the system may include one or more computing systems 101 that may be connected as clients. Each of the computing clients may be a subtype of the computing system 101 and are designated with an alphabetical denomination to differentiate each computing client, for example, 101a, 101b, 101c. Each computing client 101a, 101b, 101c may be connected via a network 209 to a server 201. Embodiments of the clients 101a, 101b, 101c may be any type of computing system 101. Examples of computing systems 101 that embodiments of the clients 101a, 101b, 101c may include but are not limited to, are a personal computer (PC), desktop computer, laptop computer, tablet computer, cellular telephone, smart phone, network enabled watches such as a Pebble or Apple watch, network enabled eye ware such as Google Glass, network enabled smart televisions, video game consoles, or network enabled music players or media devices such as an iPod, Roku box, Google Chromecast, Apple TV, Amazon Fire, Amazon Kindle or any other computing system 101 equipped with a processor 103 coupled to a memory device 105 and an I/O interface 109, capable of connecting to a network and communicates with the central server 201. Embodiments of the clients 101a, 101b, 101c may be distinct and different types of computing devices each connecting to the network 209 independently from the other computing systems 101.

In some embodiments, each of the clients 101a, 101b and 101c may be equipped with their own onboard or directly attached computing components such as a processor 103, specifically differentiated as 103a, 103b, 103c in the accompanying drawings to differentiate each independent and distinct processor for each client. Each processor 103a, 103b and 103c may be coupled to a respective memory device 105a, 105b, 105c and an I/O interface 109a, 109b, 109c. In other embodiments, one or more clients may establish a connection to another client and share or pool computing system resources. Each of the clients may further have program code 107a, 107b, 107c for a publishing tool loaded in the memory device of the respective client. The computing components of the computing clients may be comprised of physical hardware components, virtual components or a combination thereof. In some embodiments, the computing clients may include one or more partitions of computing clients with resources allocated to each partition, allowing each partition of the computing client to act as its own independent computing client on the network 209.

As depicted in the figures, embodiments of the system may include a plurality of computer clients 101a, 101b, 101c, however it should be known by those skilled in the art that embodiments may include more than the three clients depicted by the drawings. Computing networks and social media networks in particular may simultaneously serve dozens, hundreds, thousands, millions, and even billions of users, each connecting with one or more of their own independent computing clients. Embodiments of the disclosure should not be limited to three clients depicted. The limited number of computing clients is intended for sake of simplifying the illustration.

Embodiments of the computer clients 101a, 101b, 101c may each connect to a server 201 through a network 209. A network may be any type of computing network capable of linking computing systems together (including the computer clients and server depicted), through one or more communication channels to facilitate communication and resource-sharing among the member computing systems of the network 209. Examples of the different types of networks that network 209 may be may include but is not limited to a local area network (LAN), personal area network (PAN), home area network (HAN), wide area network (WAN), enterprise private network (EPN), a virtual private network, a global area network (GAN), the Internet, intranet, metropolitan area network (MAN), storage area network, system area network (AKA cluster area network) or combinations thereof. In some embodiments, the network may be a cloud based computing network, having one or more physical or virtual computing clients connected to a server administering the resources of the cloud based network.

As shown in embodiment 200, the computing clients 101a, 101b and 101c may not only communicate with one another through network 209, but they may also communicate with the server 201. A server may be any computing system 101 connected on the network 209 that may manage the resources of the network 209. The server 201 may have a program or server application 210 loaded in the server's memory device 205 which may direct the server 201 how resources of the network should be managed. Examples of server applications 210 that may be loaded in the server memory device 205 may include Apache, IBM's Domino, Microsoft's Internet Information Server (IIS), nginx, Novell's Netware and Google Web Server (GWS).

Embodiments of a server 201, may be either a physical or virtual server and the server may take the form of any known server type, which may include but may not be limited to a web server, application server, cloud server, database server, mail server, real time communication server (i.e. chat or IRC server), FTP server, list server and open source server. The server 201 may be a dedicated server in some embodiments, while in other embodiments the server 201 may be equipped to execute several programs simultaneously, or nearly simultaneously.

In embodiment 200, the server 201 may be part of a social media network and may be acting as a host to a social media website or social media application. The term "social media network" may refer to websites and/or application that may enable users of the website or application to create, share and distribute published content to users participating with the website or application. The server 201 may receive requests from any of the client computing systems 101a, 101b, 101c connected to the server through the network. The requests from the computing clients may relate to information and data (data sources) stored accessible to the server 201. Embodiments of the data sources may be stored in one or more of the server's repositories 203. These requests from the client computing systems may include requests to retrieve information stored on the server 201, requests to alter or delete the content stored on the server 201 and/or requests to add information to the repository 203 of the server.

For example, the server may be web server that provides media content to users of the website when the users visit the website. A user may connect to a social media website or application via a computing client through the use of their web browser and request from the server a specific file or web page containing text, images, video, audio or a combination thereof. Through network 209, a computing client may request the file or webpage from the server 201 and the server may subsequently retrieve the page from repository 203 and provide the files or data from the files back to the requesting client.

In another example, instead of simply requesting the retrieval of a file, a computing client may request the file, modify the data of the file and then upload the modified file back to the server 201 for storage in the repository 203, so that the user of the computing client or other users on separate computing clients, may retrieve, modify or display the modified file at a later point in time. Similarly, a computing client may not initially request a file be provided, but instead, a user may create a new file to upload to the server's repository 203.

The term "repository" 203 may refer to a location where sources of data is stored and managed. The repository 203 may also be referred to as a data warehouse which may contain additional sub layers referred to as data marts. The types of data that may be stored in repository 203 may include public or private databases, flat files, unstructured files including text files, documents, audio, video, analog data, images email, or web pages. Other types of data that may be stored in repository 203 may further include web services, social media services, software applications or platforms, messaging services, user profile information, log files such as network performance or application logs, and tracking information.

In some embodiments of the system 200, the server 201 may load program code 107 of a publishing tool program into the server's memory device 205. In the embodiment depicted in FIG. 2, the publishing tool may further include an analytics plugin module loaded in the memory 205 of the server 201 as well. The analytics module 207 may be integrated into the program code 107 of the publishing tool, or alternatively, the analytics module 207 may be part of a separate program, application, module, or service communicating with the publishing tool.

The analytics module may include program code that utilizes a computing system, such as server 201 or the network connected computing clients, to perform analysis of the data managed and stored by the computing systems 101 of the network 209. The statistical analysis of the data may be performed by the analytics module 207, receiving the data. The data received by the analytics module may be received from one or more data sources, including data stored in repository 203, separate joint repositories 401 connected to the network 209, data storage devices 11 or repositories connected to individual clients 101a, 101b, 101c. The data provided to the analytics module may be analyzed, stored and/or retained by the analytics module in one or more repositories, databases and/or or data warehouses and may be recalled or queried at a later point in time by the publishing tools, a user or administrator of the computing system(s) of the network 209.

The analytics module 207 of the publishing tools may monitor the activity of each user on the social media network, including the publishing user and any associated users. The analytics module 207 may categorize and track habits of each user, the content of the social media network that each user views, publishes, republishes, shares with other users, or comments about while connected to the social media network. Examples of information that the analytics module may collect and categorize about the users of the social media network and the user's social media network preferences or habits, may include data relating to the content published, content viewed, content searched, the types of content a user may subscribe to and receive updates, ratings or expressions of interest in the content viewed or the searched on the social media network, published comments, "likes" and the content or metadata of private messages between users. The analytics module may observe, and record patterns of publication frequency or viewing frequency and the module may draw conclusions based on the correlation between the characteristics of the publishing user's and associated user's habits and interests in order to identify which associated users are most likely to publish, republish, view, rate or comment on content. The analytics module may also determine which publishing users on the network that an associated user is most likely to interact with, based on the type or category of content being published or viewed.

In some embodiments, the analytics module may also collect and analyze information voluntarily supplied through forms or other submissions provided to the social media network by the publishing user and associated user, including names, addresses, phone numbers, school, interests, and other information requested by the social media network. In some embodiments, the analytics module may collect location information and derive relationships between publishing users and associated users, such as family, siblings, children parents, classmates, roommates, etc.

In some embodiments, the analytics module may use the information collected to draw conclusions about the publishing and associated users participating in a social media network, their publishing and viewing habits. Based on the information collected and analyzed by the analytics module, the analytics module may create a psychological profile detailing the content preferences of each publishing and associated user, detailed relationship mappings between a publishing user and associated users, including an evaluation of the probabilities that an associated user may publish, republish, or share the content published to the social media network by a publishing user of the social media network.

Armed with the information provided to analytics module and conclusions drawn by the analytics module, the publishing tools may individually analyze each publishing request made by a publishing user on a social media network and subsequently determine which associated users of the social media network's user base would also independently publish the same content, republish the content, publish similar content or simply enjoy viewing the content. For example, a publishing user may publish to the social media network a series of video clips or photographs of the publishing user's children. The analytics module may recognize that often or nearly every time the user posts images of the user's children, the user's wife, who is also the mother of the user's children republishes, comments, rates the content the user publishes. Additionally, the user's wife may also publish her own content regularly or semi-regularly of herself with the user and the user's children. Based on the activity of both the user and the user's wife, the relationship between the publishing user and the publishing user's wife as a married couple, and a common interest in the subject of the publishing user's children, the analytics module may identify the publishing user's wife as having a close enough association with the user of the social media network, that the publishing user's wife would be considered an associated user. The publishing tools may also determine that it is likely that the associated user (publishing user's wife) may independently publish the same content, republish the content, publish similar content or simply enjoy viewing the content of the publishing user. The analytics module may draw these conclusions and record the conclusions in a repository, such as a database, for further action at a later point in time.

In some embodiments, the publishing tools may utilize the conclusions drawn by the analytics module to assign probabilities that certain events may occur on the social media network. When a request is made by a publishing user to publish content to the social media network, the publishing tools may assign probabilities that an associated user may publish, republish, share or enjoy viewing the same or similar content to the social media network as well. The value of the probabilities and the confidence of the publishing tools to accurately estimate these probabilities may correlate to the types of data provided by the analytics module from the data sources and the repository. The more data that is available to the analytics module, and the more likely that the data provided is on-point with the request being made by the publishing user, the more likely that the publishing tools may predict with higher confidence that one or more associated users of the social media network may publish, republish, share, or enjoy viewing the content being proposed for publication by the publishing user. The Confidence levels of the publication tools in the probabilities estimated of an event occurring may range from 0 to 100% confidence. For example, the probability that that an event, such as a publishing user publishing content, followed by an associated user separately publishing the same content, republishing the content, rating the content published, commenting on the content, etc. may have a confidence level of ≥1%, ≥10%, ≥20%, ≥30%, ≥40%, ≥50%, ≥60%, ≥70, ≥80%, ≥85%, ≥90%, ≥95%, ≥99% or 100%.

In some embodiments of the publishing tools, the publishing tools may trigger or execute specific actions when the probability and/or confidence level of a specific event occurring rises above, is equal to, or falls below a predetermined or a specified threshold value. For instance, the publication tool may be programmed to request the server 201 to jointly publish content to the social media network as if the content was published by both a publishing user and the associated user. If, the publishing user submits a request to publish a document, image, audio and/or video to the social media network, and the publishing tools determines there is a high probability and/or confident (i.e. ≥75-99%) that the associated user may publish, republish or share the content being published by the publishing user, with other users of the social media network, the publication tools may request that the server 201 publish the content to the social media network as a joint publication.

In embodiments where a joint publication is published on the social media network, the publishing user and each of the associated users may be identified by one or more names that could be considered interchangeable. For example, the publishing user who initiates the request to publish the content on the social media website may also be referred to as the original user, the original author, requesting user, or the first user. Conversely, the associated user that may jointly publish, republish or share the content on the social media network may be referred to as the joint user, other user, trusted user or republishing user.

The phrase "associated user" may indicate a user of the social media network as having an approved status level either identified by the publishing tools or approved by the publishing user, to publish, republish, or share the content of the publishing user's publications as either a joint publishing author when the publishing user and associated user have a common collection of subscribers or separately publishing the publishing user's content under the associated user's name only where users of the social media network subscribe to receive content of the associated user only. In some embodiments, the publishing user making a request to publish content as a joint publication, may be required to request approval from the associated user to publish the content, before the content is published to the social media network for content viewers. If, the associated user accepts the publishing user's request to make the content publication a joint publication, then both the associated user and the publishing user may be displayed as joint authors of the content.

In some embodiments of the publication tool, the publishing tools may request publishing the content as a joint publication automatically, without requesting permission from any of the plurality of publishing users or associated users that will be considered authors of the joint publication. In other embodiments, the publication tool may request permission from the publishing user initially requesting publication of the content and/or the one or more associated users identified as being likely to publish, republish or share the content, to publish the content under their user name on the social media network. In some alternative embodiments of the publishing tools, the publishing tools may request permission from the associated user when the probability or confidence level of the publishing tools falls below a pre-determined threshold. For instance, based on the analytics module's analysis of the publishing and associated user, the publishing tools may determine that there is <85% probability that the associated user may publish, republish or share content being requested for publication by the publishing user. Under these circumstances where the publishing tool is not overly confident, a request for permission to publish the content as a joint publication may be generated and submitted to the publishing user and/or one or more of the associated users being considered for joint publication. Upon approval of the request, the publishing tools may publish a joint publication to the social media network under the publishing user's name and the name of each of the approving associated users. Conversely, if one or more of the associated users disapprove of the proposed joint publication, the publishing tools may not include these disapproving authors in the joint publication of content. In some embodiments, the publication tools may deny the joint publication when the published content is not approved by any of the associated users and instead, the publishing tools may publish the content as originally requested, by including the publishing user's name as the only author.

The location of the analytics module 207 in the system performing a method of publishing content to a social media network may vary from embodiment to embodiment. As shown in FIG. 2, the analytical analysis of data may be performed on the server side by the server 201 side of the network, wherein the analytics module is loaded in the server memory device 205. In an alternative embodiment depicted in FIG. 3, the analytical analysis may be performed on the client side of network 209, by one or more computing clients 101a, 101b, 101c connected to the server 201. While a plurality of computing clients may have an analytics module loaded in the memory 105 of the computing client, it is not necessary that every computing client has the analytics module loaded for the described method to be implemented. The method for publishing content to a social media network may be performed with at the very least, a single computing client 101a, 101b, 101c or a single server 201 having the analytics module loaded in the memory device of the client or server.

Figure 3:
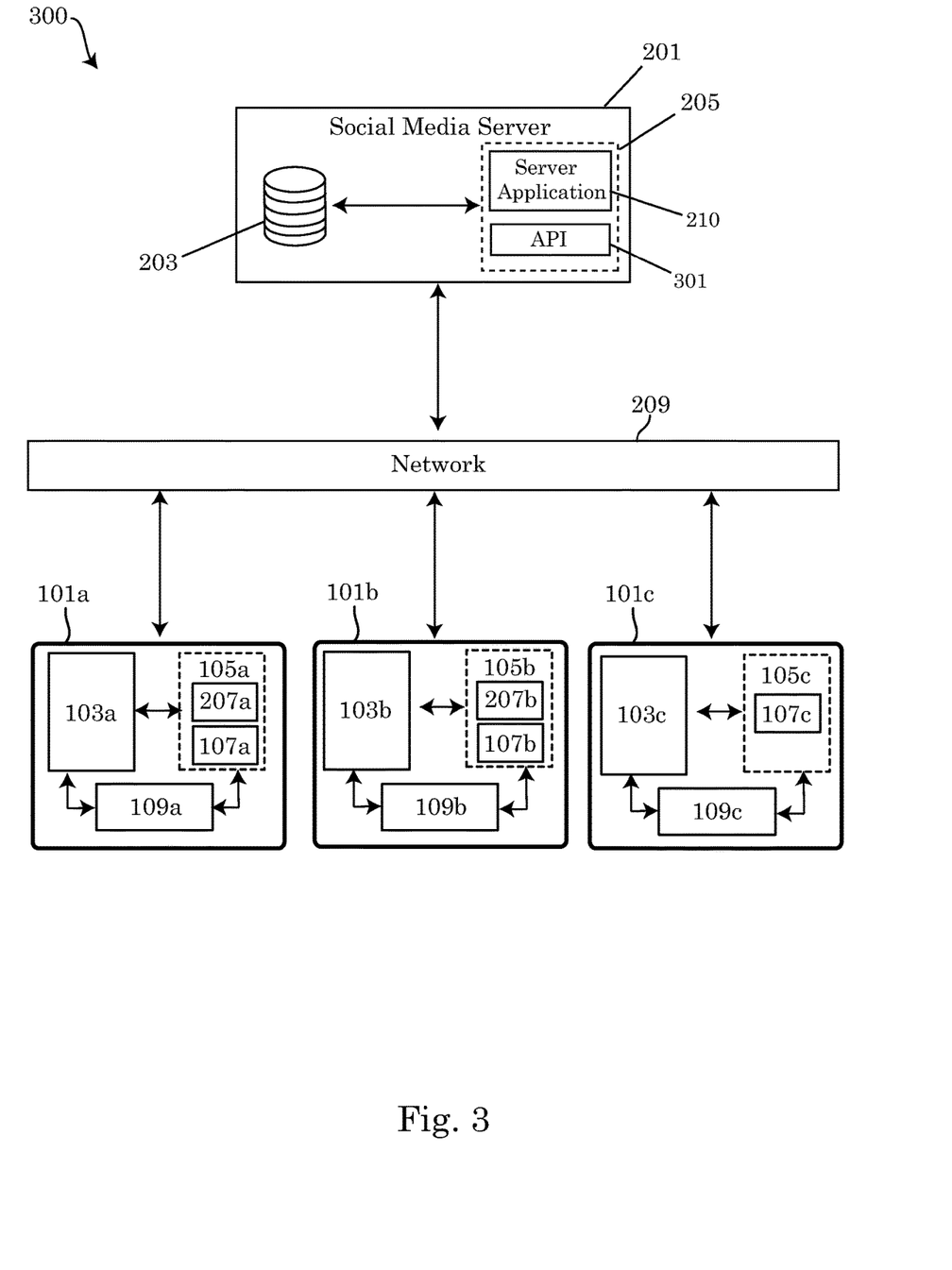
FIG. 3 depicts an alternate embodiment of a schematic of a computing network configured to perform a method for publishing content to a social media network.

In some embodiments, such as embodiment 300 shown in FIG. 3, a computing system 101 lacking the analytics module or publishing tool program may interpret information and requests by a computing system loaded with the analytics module and/or publishing tools through the use of an application programming interface (API) 301. The API may allow for software applications to communicate with remote applications over a network using a series of calls. The API may integrate the features and functionalities of the publishing tools and analytics module into existing software. In the embodiment shown in FIG. 3, the API may facilitate the integration of the publishing tool functionalities, including the analytics module, into the server application 210, allowing for the server 201 to fulfill requests made by the computing clients having the publishing tools and/or analytics module. The use of an API allows for the server to operate in accordance with the methods for publishing content to a social media network, without having to require specific server application software to be loaded. The use of an API, instead of a specific publishing tool program, may be useful in situations where the functionalities of the publishing tools is constantly changing or updated. The inclusion of an API removes the hassle of having to constantly update the server with an updated server application, or reduce the need for the publishing tools to access the server in order to upload the most recent publishing tool software.

Figure 4:
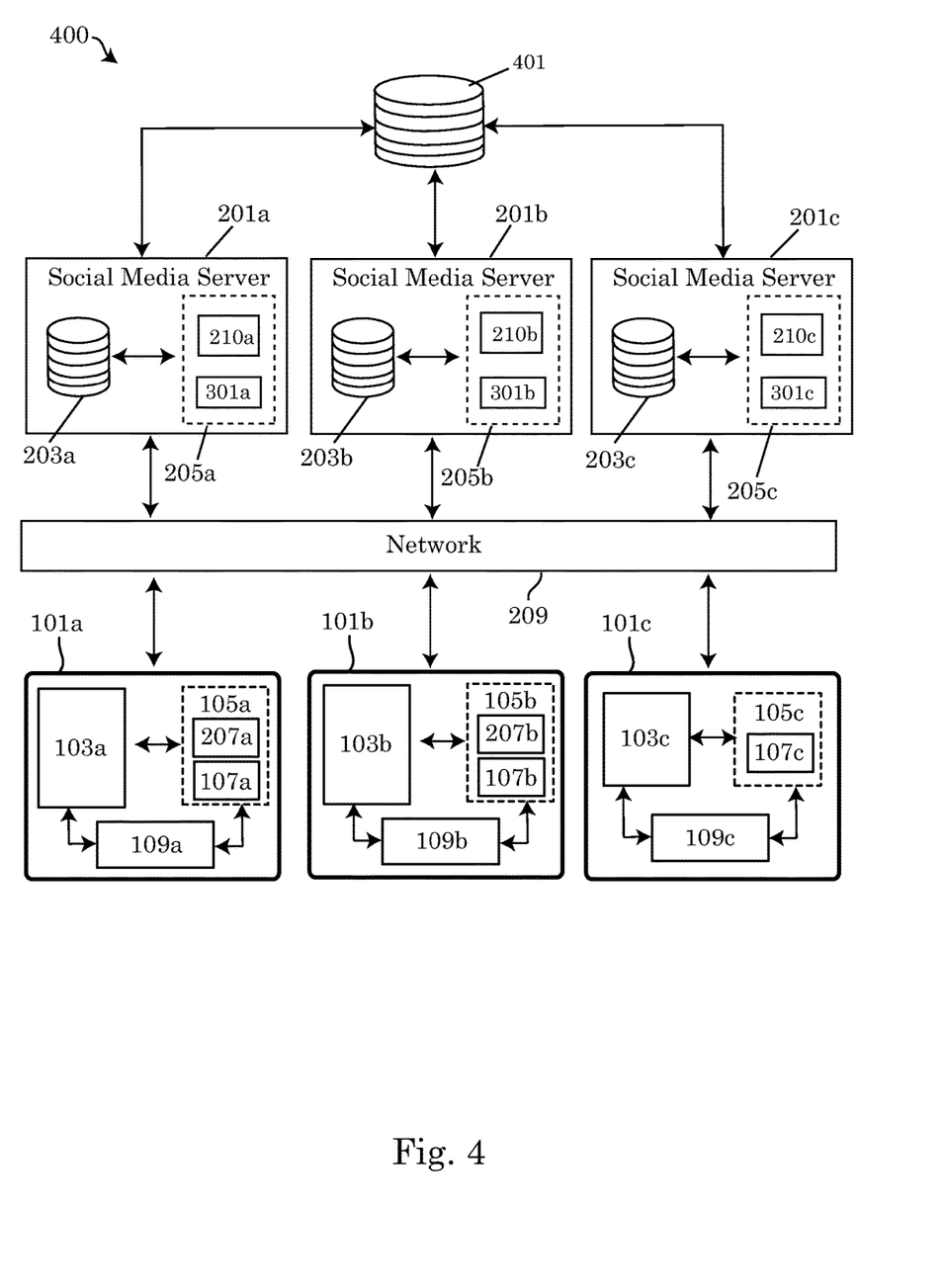
FIG. 4 depicts a second alternate embodiment of a schematic of a computing network configured to perform a method for publishing content to a social media network.

In alternative embodiments, such as the embodiment 400 depicted in FIG. 4, the publishing tools and methods for publishing content to a social media network may not be simply limited to a single social media network. Instead, some embodiments of the publishing tools and methods may allow for joint publications of content across multiple social media networks. Embodiments directed toward publishing across different social media networks may also have an increased amount of analytics information provided to the analytics module because additional data directed toward each of the social media networks being analyzed may be collected as one or more data sources. The data collected and analyzed by the analytics module may be stored in individual repositories 203a, 203b, 203c containing data specifically targeted toward the users of the specific social media networks hosted by each server. Additionally, in some embodiments, a central repository 401 may be implemented to receive data, user information and publication content from each social media network and further supply the data or publication content to another social media network when requested by the publication tools.

For example, social media server 201a may be dedicated toward serving requests made for a social media network such as Facebook®, while social media server 201b may be dedicated toward serving requests made for the social media network Twitter®. While each server may serve separate social media networks, the data collected from the users of each social media network may be analyzed by the analytics module and used for determining probabilities and/or confidence levels for identifying a situation where joint publications by publishing users and associated users across multiple social media networks could be performed. In this embodiment, a publishing user may post an image, video, text, audio or any other type of information to a first social media network and the publishing tools may determine that it would be probable that an associated user on a separate social media network may publish, republish or share the same content for others on the second social media network.

In one or more embodiments, a situation may arise where the publishing tool may determine that the publishing user on the first social network and the associated user on the second social network are in fact the same person reposting the same information across multiple social media networks. The publishing tools may reduce the time it takes to republish the same content multiple times, and instead automatically jointly publish the content across all social media networks the publishing user participates in using various associated user names.

Figure 5:
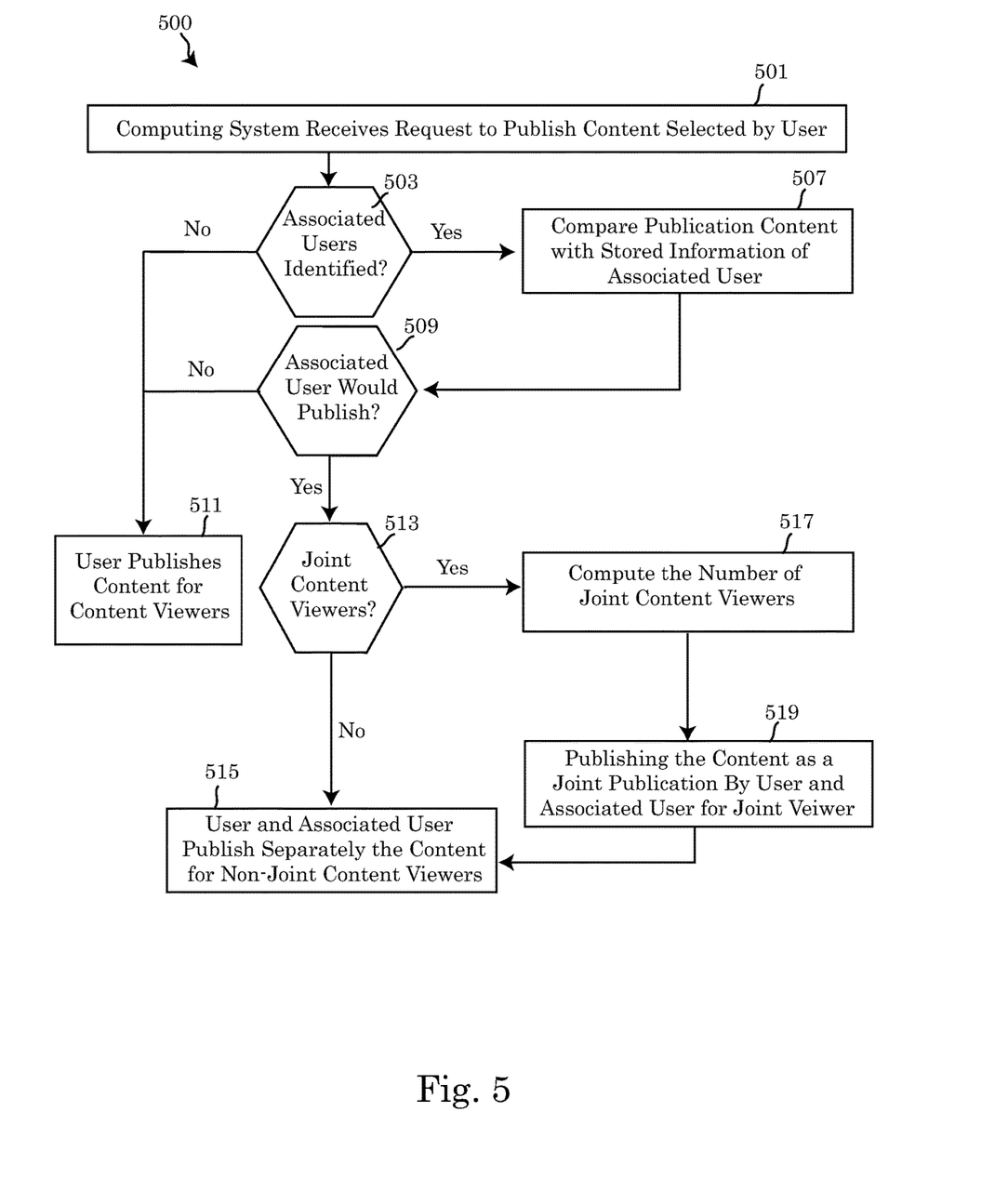
FIG. 5 depicts a flow chart of an algorithm for performing a method for publishing content to a social media network.
Figure 6:
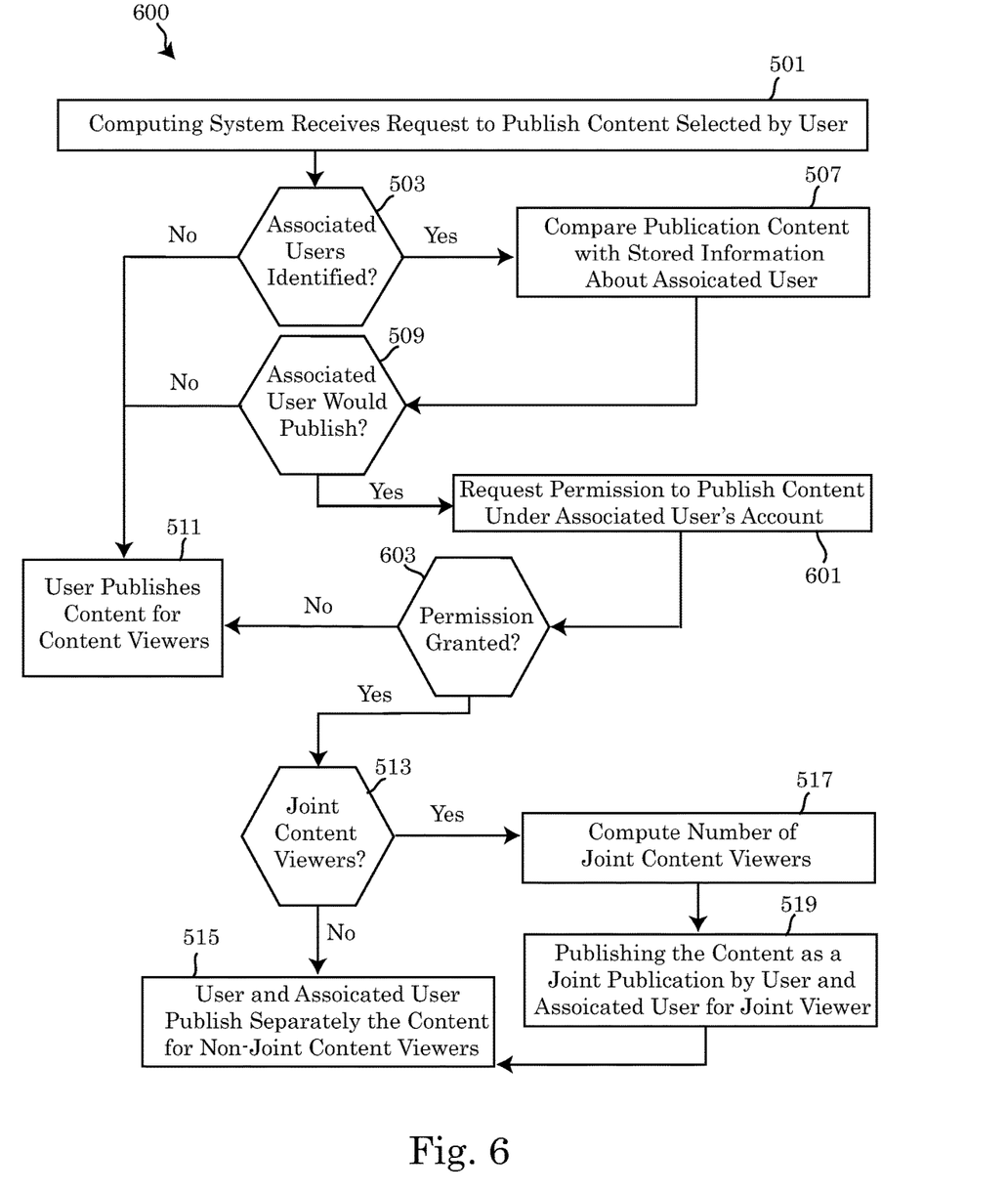
FIG. 6 depicts a flow chart of an alternative algorithm for performing the method for publishing content to a social media network.
Figure 7:
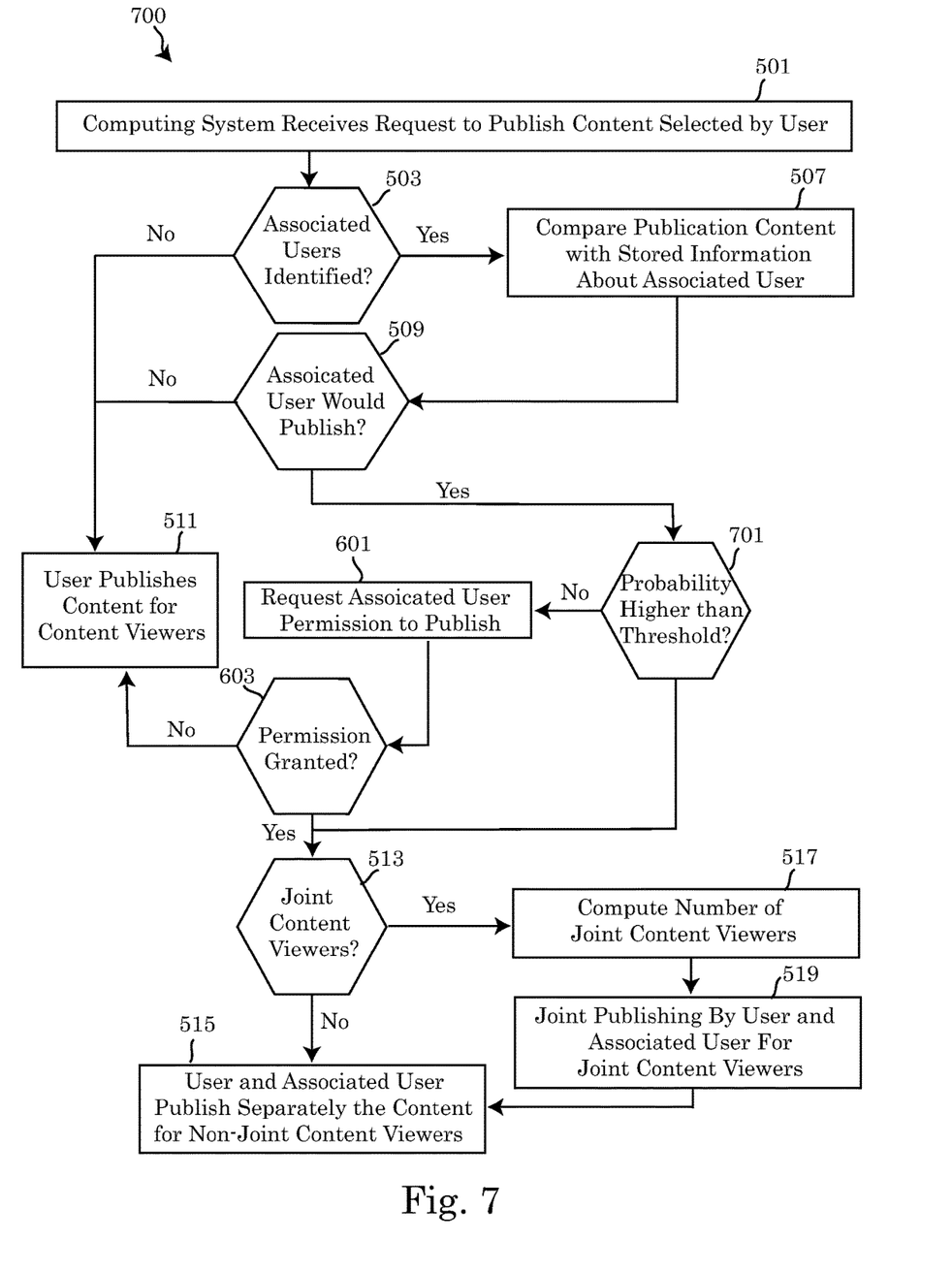
FIG. 7 depicts a flow chart of a second alternative algorithm for performing the method for publishing content to a social media network.

Referring back to the drawings, the flow chart of FIGS. 5-7 depict embodiments 500, 600, 700 of algorithms for implementing a method for publishing content to a social network. Embodiments of the algorithm may implement procedures that vary from those specifically described in FIGS. 5-7. For example, certain steps may be omitted, or performed in a different order. The examples specifically shown in FIGS. 5-7, or any of the other figures in this disclosure should not be construed as limiting embodiments of the present disclosure. Furthermore, each of the steps in the algorithm of the figures, may be enabled and executed in any order by a computer processor executing computer code.

In step 501 a computing system receives a request to publish content, selected by a publishing user on a social media network. The publishing user may perform step 501 by requesting to upload the content to a social media network from a computing client 101a, 101b, 101c connected to the network 209. The request to upload may be performed to the appropriate server 201 on the network associated with managing and maintaining the social media network. Examples of content being requested to be uploaded may include newly created content, republication of existing content, modification of existing content, or deletion of content.

In step 503, the publishing tool may identify the existence of any associated users who may have granted permission to the publishing user or the publication tool to jointly publish content as a joint publication naming both the publishing user and associated user as the authors. To implement step 503, the publishing tool may make a determination of whether any additional associated users on the social media network have granted permission to the publishing user or publishing tool to jointly publish the publishing user's content. The granting of permission by an associated user on the social media network may be performed through express approval, selection, request or agreement by the publishing user and the associated user. The associated user status indicates to the publishing tool that there is approval for the publication tool to make a joint publication with the associated user as a co-author, when the publication tool determines that it is appropriate to do so.

If the publishing tool makes the determination that one or more associated users have granted permission to jointly publish content with the publishing user, the publishing tool may proceed to perform step 507, which may include the step of comparing the content being requested for publication with the stored data about the associated user. As described above, the stored data being used for comparison may include information relating to the associated user's publishing habits, preferences, and interests. In some embodiments of step 507 the publication tool may utilize the data and conclusions drawn by the analytics module about the publishing user and associated user, including the psychological profile generated by the publishing tool to determine whether or not an associated user would also publish, republish or share the content being proposed for publication. The profile generated by the publishing tool may catalog historical information and data about the activity, habits and relationships of the publishing user and associated user on the social media network. Using the generated profile, the publishing tool in step 509 may predict whether or not the associated user would independently publish the same or similar content, republish content or share the content being proposed for publication by the user.

In some embodiments, the publishing tool may implement step 509 by assigning a quantitative value or score based on the comparison made in step 507. For example, the publishing tool may make a prediction in step 509 by tabulating points or values assigned to the data collected and compared in step 507. The publishing tools may award points or values for data suggesting that the associated user may publish, republish or share the content. The publishing tools may be pre-programmed to identify specific categories of information that may positively suggest the associated user may have an interest in the content requested for publication. The categories of information may include data identifying the associated user's previous postings, interest or viewership in content of a similar nature, positive ratings or comments directed toward similar published content or categories, activity amongst users who post similar content, subscribing to the publishing user's publications, the presence of a close relationship with the publishing user, the content of the associated user's own publications and any known patterns for republishing the publishing user's published content.

The quantitative value or score assigned by the publishing tools may be in the form of a probability, confidence interval, grade, or numerical score on a fixed scale. If the quantitative value or score assigned by the publishing tools is greater than or equal to a pre-specified threshold level, the publishing tools may draw the conclusion that the associated user would more than likely publish, republish or share the content proposed for publication by the user, within a certain level of confidence. On the other hand, if the prediction score, probability or confidence interval falls below the predetermined threshold, the publishing tools may consider the insufficient score as a lack of interest by the associated user in the proposed publication content, or a lack of a discernable pattern by the associated user that suggests to the publishing tools that such content would not be published, republished or shared by the associated user in this instance.

If the publishing tools determine in step 503 that there are not any associated users on the social media network who have been granted permission to jointly publish the content of the publishing user, or the publishing tool has determined in step 509 that the associated user(s) would more than likely not publish, republish or share the content being proposed for publication, the publishing tool may proceed to publish the content in accordance with step 511, using only original user as the author to publish the content for the user's content viewers. A "content viewer" may refer to one or more users of a social media network that observes content published to the social media network by the publishing user. In some instances, the content viewer may be a "subscriber." The term "subscriber" may refer to a content viewer who has subscribed to view the content of the publishing user or subscribes to receive periodic updates or notifications when new publications are uploaded to the social media network. In some instances, a subscriber may provide money to the publishing user or social media network in exchange for the ability to view the content being published.

If, on the other hand, a determination is made in step 509 that there is a sufficient probability, or high enough confidence by the publication tool that an associated user may publish, republish or share the content of the publishing user, the publishing tool may proceed by performing step 513. The performance of step 513 may include making a determination of whether or not the publishing user and the associated user share in common any content viewers, hereinafter referred to as "joint content viewers." A "joint content viewer" may refer to a content viewer that observes or is known to observe both publications made by the publishing user and the associated user. In some embodiments, the publishing tool may make the determination based on whether or not the joint content viewer subscribes to both the publishing user's and associated user's content. In other embodiments of step 513, the publication tool may draw a conclusion about the existence of joint content viewers by analyzing reviewing the publishing history, social media activity, tracking information and habits of the content viewers of both the publishing user and associated user. The publishing tool may identify each of the users that view, subscribe, comment or actively participate with the user or associated user when a publication is uploaded to the social media network. The publishing tool may subsequently cross reference the social media network users viewing, subscribing, commenting, rating, and actively participating in the publications of the publishing user and associated user to determine if the publishing user and associated user share any social media users in common. The publishing tools may consider the social media users that view, subscribe, comment, rate and actively participate in the publications of both the publishing user and the associated user as a joint content viewer. Once the publishing tool has identified the existence of one or more joint content viewers in step 513, the publishing tool may, in step 517 compute the total number of joint content that exist between the publishing user and associated user.

In step 519, the publishing tools may publish the content requested for publication, as a joint publication 517 by both the publishing user and the associated user, for each of the joint content viewers determined in step 513 and computed in step 517. Publishing jointly in step 519, may reduce duplicative publishing, whereby the published content can be presented to the joint content viewer as a single publication by both the publishing user and associated user as the authors. Instead of a joint content viewer receiving multiple notifications, alerts or indications that two separate publications of the same content by both the publishing user and associated user are uploaded on the social media network. Duplicative publications on the social network may lead to confusion. By publishing jointly in step 519, the published content may be presented cleanly in one location on the social media network. In addition, each joint content viewer may be alerted to the publication's existence via a single notification or alert indicating the content that has been published, instead of receiving multiple notifications, which may occur if the content was published separately by multiple users.

Conversely, in some embodiments the publishing tool may identify that not only do the publishing user and the associated user have joint content viewers, but the publishing user and associated user may also have non joint content viewers that only view the content of only the publishing user or associated user, but not both. In view of the existence of non joint viewers, in step 515, the publishing tool may separately publish the content for the non joint content viewers that do not view the content of both the publishing user and associated user. Step 515 may present or display the published content on the social media network differently if a social media network user viewing the content is a joint or a non joint content viewer. As stated above, the joint content viewer may view or perceive the content being displayed on a computing system as being uploaded and/or authored by both the publishing user and the associated user. On the other hand, the publishing tool in step 515 may separately publish the content for each non joint content viewer accessing and viewing the published content.

The publishing tools may implement step 515 by performing separate or multiple uploads of content to the server 201. The first upload may include the published content as a joint publication accessible and viewable by the joint content users, displaying both the publishing user and associated user as the authors of the content. A subsequent upload to the server may be made to the server 201 by the respective publishing user or associated user, wherein the content published in the subsequent upload is viewable by non joint content viewers and specifically designates only one of either the publishing user or associated user as the author of the content. Whether the publishing user or associated user is being credited for the publication displayed on the non joint user's computing system may depend on whether the publication tool classified the non joint content viewer as a content viewer of the publishing user or a content viewer of the associated user. If the non joint content viewer was classified as a content viewer of the publishing user only, then, when the non joint content viewer accesses or views the published content, the non joint content viewer may only perceive the publishing user as the author of the publication and vice versa when the non joint content viewer is a content viewer of the associated user only.

For example, two users on the social media network Facebook® may jointly publish a series of one or more images on the network. Each user has a separate list of friends which are considered the content viewers of the respective users' published content to their profile. It is well known on Facebook® that often two users may have a plurality of friends in common between both the publishing user and the associated user. These friends in common would be considered joint content viewers, while the remainder of the friends that are friends with only the publishing user or the associated user would be considered non joint content viewers. Subsequently, when joint publication of the images is made, each of the joint content viewers may be alerted that "the publishing user and the associated user have published images." The social media network, in this example Facebook®, credits both publishing user and associated user as having uploaded the content and they appear jointly in the joint content viewers alert. However, in some embodiments, the non joint content viewers will only be alerted that "the publishing user has published images" or "the associated user has published images" depending which user the non joint content viewer is friends with.

In some embodiments of the method for publishing content to a social media network, the publishing tool may not discriminate between joint content viewers and non joint content viewers. Instead, the publication may be published on the social media network as a joint publication naming both the publishing user and associated user as authors for all content viewers on the social media network.

In the alternative embodiment of the algorithm depicted in FIG. 6, the method for publishing content may include additional steps. For instance, in the exemplary embodiment depicted, the step 601 may further request permission to publish content as the associated user, under the associated user's social media network account. In this embodiment 600, the publishing tools are not only relying on determination made in step 509 using the analytics engine and the calculation of probability that an associated user would publish, republish or share the content being requested for publication on the social media network. Rather, once the publishing tool has identified the existence of an associated user in step 503 and has determined that the content presented for publication would be content of interest to the associated user in step 509, the publishing tool will request permission in step 601 from the associated user to publish the content as a joint publication.

If the publishing tools determine in step 603 that the associated user approves the request for permission made in step 601 to jointly publish the content, then the publishing tools will proceed to identify joint content viewers in step 513, and publish the content on the social media network as a publication for joint and non joint content viewers as described above. However, if the permission request in step 601 is denied, the publishing tools may proceed to perform step 511, wherein the publishing tools publish the content to the social media network for the content viewers of the user.

In the alternative embodiment 700 depicted in FIG. 7, the algorithm of the method for publishing content to a social media network may be a hybrid of embodiment 500 and embodiment 600. In the alternative embodiment 700, additional step 701 may be included. A publishing tool implementing step 701 may make a determination of whether or not publishing the content as a joint publication requires permission from the associated user. The determination made in step 701 may be dependent upon the probability or confidence level of the publishing tools. As described above, the publishing tools or the user of the publishing tools may set a threshold level of probability or a specific confidence level when determining if an associated user would publish, republish or share the content proposed for publication by the user. The confidence level may be preset or preprogrammed, or the appropriate level of confidence may be manually adjusted by a user or administrator of the publishing tools through one or more optional settings of the publishing tool. If the determination is made in step 701 that the probability or confidence level of the publishing tools is higher than a specific threshold, the publishing tool may not request permission in step 601, rather, step 601 may be bypassed and the publishing tools may proceed to determining the presence of joint content viewers in step 513. For example, the publishing tools may set the threshold to be a probability of ≥75%, ≥85%, ≥90%, ≥95%, ≥99%. If the publishing tools are confident enough in its predictions, then no permission may be necessary and the joint publication will proceed automatically by performing steps 513, 517, 519 and 515. However, if the probability or confidence level of the publishing tools is below the pre-determined threshold level, but the publishing tools have still calculated a probability that the associated user would still publish, republish or share the content being published by the user, then the publishing tools may perform step 601, requesting permission of the associated user, in a similar manner described above for the embodiment of FIG. 6.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

The invention claimed is:

1. A method for publishing content on a social media network, said method implemented by a processor of a computing system, the method comprising steps of:
receiving, in real-time by the processor, a request to publish content selected by a user; identifying, in real-time by the processor, an associated user to jointly publish the content selected by the user,
comparing, in real-time by the processor, the content with a repository of stored information about the associated user;
calculating, in real-time by the processor, as a function of the comparing step, a probability that the content selected by the user would be published independently by the associated user on the social media network;
computing, in real-time by the processor, a number of joint content viewers shared by the user and the associated user;
determining the probability, in real-time by the processor, as having a value greater than or equal to a pre-specified threshold value, wherein the pre-specified threshold value is a confidence interval having a level of confidence greater than or equal to a level of confidence selected by the user; and
in response to the determining, automatically publishing, in real-time by the processor, the content as a joint publication on the social media network, accessible for viewing by the joint-content viewers.

2. The method of claim 1, further comprising the steps of:
publishing separately, in real-time by the processor, the content on the social media network to a first set of non-joint content viewers subscribed to receive content from the user and a second set of non-joint content viewers subscribed to receive content from the associated user, wherein the first set of non-joint content viewers perceive the content as being published by the user only and the second set of non-joint content viewers perceive the content as being published by the associated user only.

3. The method of claim 1, wherein the probability is greater than the pre-specified threshold value, the step of publishing the joint publication on the social media network occurs automatically and in real-time, without obtaining permission from the associated user.

4. The method of claim 1, wherein the probability is less than the pre-specified threshold value, the method further comprises the step of:
requesting, in real-time, by the processor, permission from the associated user to publish the content as the joint publication.

5. The method of claim 1, wherein joint-content viewers include one or more individuals registered to use the social media network and subscribed to receive content from both the user and the associated user.

6. The method of claim 1, wherein the computing system is a cloud based computing network having one or more physical or virtual computing clients connected to a server.

7. The method of claim 1, wherein the processor publishes the publication on at least two different social media networks in real-time.

8. The method of claim 1, further comprising providing at least one support service for at least one of creating, integrating, hosting, maintaining, and deploying computer-readable program code in a computer system, where the computer-readable program code in combination with the computer system is configured to implement the steps of receiving, identifying, comparing, calculating, computing and publishing.

9. A computer system comprising a processor, a memory coupled to the processor, a computer readable storage device coupled to the processor, said storage device containing program code configured to be executed by the processor via the memory to perform a method for publishing content on a social media network, the method comprising steps of:
receiving, in real-time by the processor, a request to publish content selected by a user; identifying, in real-time by the processor, an associated user to jointly publish the content selected by the user;
comparing, in real-time by the processor, the content with a repository of stored information about the associated user;
calculating, in real-time by the processor, as a function of the comparing step, a probability that the content selected by the user would be independently published by the associated user on the social media network,
computing, in real-time by the processor, a number of joint content viewers shared by the user and the associated user;
determining the probability, in real-time by the processor, as having a value greater than or equal to a pre-specified threshold value, wherein the pre-specified threshold value is a confidence interval having a level of confidence greater than or equal to a level of confidence selected by the user; and
in response to the determining, automatically publishing, in real-time by the processor, the content as a joint publication on the social media network, accessible for viewing by the joint-content viewers.

10. The system of claim 9, wherein the method further comprises:
publishing separately, in real-time by the processor, the content on the social media network to a first set of non-joint content viewers subscribed to receive content from the user and a second set of non-joint content viewers subscribed to receive content from the associated user, wherein the first set of non-joint content viewers perceive the content as being published by the user only and the second set of non-joint content viewers perceive the content as being published by the associated user only.

11. The system of claim 9, wherein the probability is greater than the pre-specified threshold value, the step of publishing the joint publication on the social media network occurs automatically and in real-time, without obtaining permission from the associated user.

12. The system of claim 9, wherein the probability is less than the pre-specified threshold value, the method further comprises the step of:
requesting, in real-time by the processor, permission from the associated user to publish the content as the joint publication.

13. The system of claim 9, wherein joint-content viewers include one or more individuals registered to use the social media network and subscribed to receive content from both the user and the associated user.

14. A computer program product, comprising a computer readable storage device having a computer readable program code stored therein, said program code configured to be executed by a processor of a computing system to perform a method for publishing content on a social media network, said method comprising steps of:
receiving, in real-time by the processor, a request to publish content selected by a user; identifying, in real-time by the processor, an associated user to jointly publish the content selected by the user;
comparing, in real-time by the processor, the content with a repository of stored information about the associated user;
calculating, in real-time by the processor, as a function of the comparing step, a probability that the content selected by the user would be published independently by the associated user on the social media network,
computing, in real-time by the processor, a number of joint content viewers shared by the user and the associated user;
determining the probability, in real-time by the processor, as having a value greater than or equal to a pre-specified threshold value, wherein the pre-specified threshold value is a confidence interval having a level of confidence greater than or equal to a level of confidence selected by the user; and
in response to the determining, automatically publishing, in real-time by the processor, the content as a joint publication on the social media network, accessible for viewing by the joint content viewers.

15. The computer program product of claim 14, wherein the method further comprises
publishing separately, in real-time by the processor, the content on the social media network to a first set of non-joint content viewers subscribed to receive content from the user and a second set of non-joint content viewers subscribed to receive content from the associated user, wherein the first set of non-joint content viewers perceive the content as being published by the user only and the second set of non-joint content viewers perceive the content as being published by the associated user only.

16. The computer program product of claim 14, wherein the probability is greater than the pre-specified threshold value, the step of publishing the joint publication on the social media network occurs automatically and in real-time, without obtaining permission from the associated user.

17. The computer program product of claim 14, wherein the probability is less than the pre-specified threshold value, the method further comprises the step of:
   requesting, in real-time by the processor, permission from the associated user to publish the content as the joint publication.

18. The computer program product of claim 14, wherein the computing system is a cloud based computing network connecting one or more physical or virtual computing clients to a server.

19. The computer program product of claim 14, wherein the processor publishes the joint publication in real-time on at least two different social media networks.

* * * * *